(12) United States Patent
Watchorn

(10) Patent No.: US 7,877,933 B2
(45) Date of Patent: Feb. 1, 2011

(54) MOUNTING OF OFFSHORE STRUCTURES

(75) Inventor: Michael John Watchorn, Northumberland (GB)

(73) Assignee: IHC Engineering Business Limited (GB)

( * ) Notice: Subject to any disclaimer, the term of this patent is extended or adjusted under 35 U.S.C. 154(b) by 0 days.

(21) Appl. No.: 10/531,857

(22) PCT Filed: Oct. 20, 2003

(86) PCT No.: PCT/GB03/04529

§ 371 (c)(1),
(2), (4) Date: Apr. 19, 2005

(87) PCT Pub. No.: WO2004/038108

PCT Pub. Date: May 6, 2004

(65) Prior Publication Data

US 2005/0286979 A1    Dec. 29, 2005

(30) Foreign Application Priority Data

Oct. 23, 2002    (GB) ................................ 0224656.9

(51) Int. Cl.
E04H 12/00    (2006.01)
(52) U.S. Cl. ........................................................ 52/40
(58) Field of Classification Search ............... 405/203, 405/224, 172, 184.4, 225, 224.2; 166/341, 166/342; 52/40, 296, 297, 298, 745.17, 745.18; 248/523, 514, 515, 218.4
See application file for complete search history.

(56) References Cited

U.S. PATENT DOCUMENTS

| | | | |
|---|---|---|---|
| 233,159 A | 10/1880 | Mooney | |
| 259,685 A | 6/1882 | Haven et al. | |
| 555,542 A | 3/1896 | Throop | |
| 1,378,948 A * | 5/1921 | Hage | 52/298 |
| 1,759,105 A | 5/1930 | Evans | |
| 2,527,653 A | 10/1950 | Pierce | |
| 2,896,564 A | 7/1959 | Wright | |
| 2,955,299 A | 10/1960 | Ingram, Jr. | |
| 3,004,391 A | 10/1961 | Miller | |
| 3,008,158 A | 11/1961 | Stinson | |
| 3,152,568 A | 10/1964 | Mayer | |
| 3,216,639 A | 11/1965 | Castela | |

(Continued)

FOREIGN PATENT DOCUMENTS

CH    241601 A    3/1946

(Continued)

OTHER PUBLICATIONS

International Search Report of PCT/GB03/04529.

(Continued)

*Primary Examiner*—Sunil Singh
(74) *Attorney, Agent, or Firm*—Ryan A. Schneider, Esq.; Troutman Sanders LLP

(57) ABSTRACT

Offshore structures such as wind turbines, wave machines and tidal stream turbines are mounted in a previously located foundation including a socket. The foundation includes an upper body with a conical inner surface which acts as a guide for inserting a leading end of the structure into the socket. The conical surface also provides a reaction surface for setting the vertical alignment of the structure when inserted in the socket. Clamps are provided supported by an A frame for controlled lowering of the structure into the socket.

8 Claims, 9 Drawing Sheets

U.S. PATENT DOCUMENTS

| | | | |
|---|---|---|---|
| 3,237,414 A | 3/1966 | Straub et al. | |
| 3,372,849 A | 3/1968 | Hall et al. | |
| 3,503,512 A | 3/1970 | Desty et al. | |
| 3,589,580 A | 6/1971 | Smulders | |
| 3,608,316 A | 9/1971 | Manuel | |
| 3,638,288 A | 2/1972 | Pryor | |
| 3,692,144 A | 9/1972 | Summer et al. | |
| 3,716,994 A | 2/1973 | Pogonowski | |
| 3,739,971 A | 6/1973 | Silvestri et al. | |
| 3,747,354 A | 7/1973 | Macomber | |
| 3,788,396 A * | 1/1974 | Shatto et al. | 166/341 |
| 3,808,625 A | 5/1974 | Fowler | |
| 4,027,486 A | 6/1977 | Dougherty | |
| 4,073,155 A | 2/1978 | Schiemichen | |
| 4,083,072 A | 4/1978 | Ryan | |
| 4,133,067 A | 1/1979 | Bennett et al. | |
| 4,133,283 A | 1/1979 | Ryan | |
| 4,162,551 A | 7/1979 | Serrano | |
| 4,169,296 A | 10/1979 | Wipkink et al. | |
| 4,222,683 A * | 9/1980 | Schaloske et al. | 405/204 |
| 4,285,454 A | 8/1981 | Plumettaz | |
| 4,286,346 A | 9/1981 | Wiek | |
| 4,333,196 A | 6/1982 | Bougaran | |
| 4,363,150 A | 12/1982 | Nilsson | |
| 4,366,591 A | 1/1983 | Zimmerman | |
| 4,369,538 A | 1/1983 | Smedal | |
| 4,406,094 A | 9/1983 | Hempel et al. | |
| 4,459,931 A * | 7/1984 | Glidden | 114/230.1 |
| 4,521,132 A | 6/1985 | Isakson et al. | |
| 4,581,784 A | 4/1986 | Rousseau et al. | |
| 4,590,634 A | 5/1986 | Williams | |
| 4,596,494 A | 6/1986 | Manesse et al. | |
| 4,602,697 A | 7/1986 | Aanensen | |
| 4,611,953 A * | 9/1986 | Owens | 405/224 |
| 4,655,641 A | 4/1987 | Weyler | |
| 4,720,214 A | 1/1988 | Brasted et al. | |
| 4,721,412 A | 1/1988 | King et al. | |
| 4,789,271 A * | 12/1988 | Sullaway et al. | 405/225 |
| 4,869,615 A * | 9/1989 | Galle | 403/11 |
| 4,872,782 A | 10/1989 | Streichenberger | |
| 4,902,169 A | 2/1990 | Sutton | |
| 4,917,540 A | 4/1990 | Recalde | |
| 5,020,940 A | 6/1991 | Smith | |
| 5,126,134 A | 6/1992 | Heim et al. | |
| 5,263,624 A | 11/1993 | Zuidberg | |
| 5,860,379 A | 1/1999 | Moody | |
| 5,893,682 A | 4/1999 | Oliveri | |
| 5,950,267 A | 9/1999 | Ricci, Jr. | |
| 6,131,224 A | 10/2000 | Bernal | |
| 6,131,528 A | 10/2000 | Meek et al. | |
| 6,347,424 B1 | 2/2002 | Vatne | |
| 6,408,780 B1 | 6/2002 | Ozaki et al. | |
| 6,409,428 B1 * | 6/2002 | Moog | 405/169 |
| 6,425,441 B2 | 7/2002 | Shaaban et al. | |
| 6,425,708 B1 | 7/2002 | Siegfriedsen | |
| 6,435,795 B1 | 8/2002 | Brady | |
| 6,439,445 B1 | 8/2002 | De Groot et al. | |
| 6,592,416 B1 | 7/2003 | Hochschild, III | |
| 6,619,432 B1 | 9/2003 | Yasui | |
| 6,651,858 B2 | 11/2003 | Shen | |
| 6,739,430 B2 | 5/2004 | Hill | |
| 6,745,714 B1 | 6/2004 | Faber | |
| 6,923,140 B1 | 8/2005 | Cook | |
| 7,021,510 B2 | 4/2006 | Ellingson | |
| 7,025,332 B2 | 4/2006 | Rincoe | |
| 7,103,935 B2 | 9/2006 | Hill | |
| 7,178,708 B2 | 2/2007 | Grinsted | |
| 7,377,412 B2 | 5/2008 | Grinsted | |
| 2001/0040031 A1 | 11/2001 | Shaaban et al. | |
| 2002/0083881 A1 | 7/2002 | Arias | |
| 2002/0085883 A1 | 7/2002 | Meyers et al. | |
| 2003/0182741 A1 | 10/2003 | Prins | |
| 2003/0217681 A1 | 11/2003 | Funk | |
| 2004/0045226 A1 | 3/2004 | Dehlsen et al. | |
| 2005/0179019 A1 | 8/2005 | Ellingson | |
| 2005/0286979 A1 | 12/2005 | Watchorn | |
| 2006/0078385 A1 | 4/2006 | Watchorn | |
| 2006/0153644 A1 | 7/2006 | Grinsted | |
| 2006/0208245 A1 | 9/2006 | Diehl | |
| 2008/0145149 A1 | 6/2008 | Grinsted et al. | |
| 2008/0188148 A1 | 8/2008 | Simon-Bouhet | |
| 2008/0229524 A1 | 9/2008 | Watchorn et al. | |
| 2008/0289126 A1 | 11/2008 | Stapel | |
| 2008/0301888 A1 | 12/2008 | Watchorn et al. | |
| 2009/0028647 A1 | 1/2009 | Bingham et al. | |
| 2009/0050045 A1 | 2/2009 | Grimaldi | |

FOREIGN PATENT DOCUMENTS

| | | |
|---|---|---|
| CH | 363463 A | 7/1962 |
| DE | 597453 C | 5/1934 |
| DE | 2341846 | 2/1975 |
| DE | 19607972 C | 1/1998 |
| DE | 10249779 | 5/2004 |
| EP | 0255191 | 2/1988 |
| EP | 0296272 | 12/1988 |
| EP | 0524648 | 1/1993 |
| EP | 1101935 | 5/2001 |
| EP | 1209028 | 5/2002 |
| FR | 2465640 | 3/1981 |
| FR | 2586641 | 3/1987 |
| GB | 2033463 A | 5/1980 |
| GB | 2086313 | 5/1982 |
| GB | 2156744 | 10/1985 |
| GB | 2158793 | 11/1985 |
| GB | 2175332 | 11/1986 |
| GB | 2175860 | 12/1986 |
| GB | 2225753 | 6/1990 |
| GB | 2246992 | 2/1992 |
| GB | 2390632 | 1/2004 |
| JP | 61211409 | 9/1986 |
| JP | 06002317 | 1/1994 |
| JP | 2005069025 | 3/2005 |
| JP | 2006037397 | 2/2006 |
| NL | 1019706 | 7/2003 |
| NL | 1023142 | 10/2004 |
| SU | 610718 | 6/1978 |
| SU | 757383 | 8/1980 |
| WO | WO 85/01970 | 5/1985 |
| WO | WO 88/03107 | 5/1988 |
| WO | WO 95/14605 | 6/1995 |
| WO | WO/97/29946 | 8/1997 |
| WO | WO 02/20343 | 3/2002 |
| WO | WO 02/48547 | 6/2002 |
| WO | WO 03/066426 | 8/2003 |
| WO | WO 03/066427 | 8/2003 |
| WO | WO 2004/040182 | 5/2004 |
| WO | 2004070119 | 8/2004 |
| WO | WO 2004/083529 | 9/2004 |
| WO | WO 2005/047097 | 5/2005 |
| WO | WO 2006/013342 | 2/2006 |
| WO | WO 2006/076920 | 7/2006 |
| WO | WO 2006/087540 | 8/2006 |
| WO | WO 2007/015079 | 2/2007 |
| WO | WO 2007/091042 | 8/2007 |

OTHER PUBLICATIONS

GB Search Report of GB 0224656.9.
Great Britain Search Report for Application No. GB 0225496.9 Dated Apr. 28, 2003.
International Search Report for PCT Application No. PCT/GB03/04697 Dated Apr. 22, 2004.
Great Britain Search Report for Application No. GB 403362.7 Dated Jun. 29, 2004.

International Search Report for PCT Application No. PCT/GB04/01208 Dated Jul. 19, 2004.

International Search Report for PCT Application No. PCT/GB04/04716 Dated Feb. 23, 2005.

International Search Report for PCT Application No. PCT/GB05/03010 Dated Nov. 22, 2005.

International Search Report and Written Opinion for PCT Application No. PCT/GB06/00525 Dated May 19, 2006.

International Search Report for PCT Application No. PCT/GB06/02860 Dated Oct. 26, 2006.

International Search Report and Written Opinion for PCT Application No. PCT/GB07/00400 Dated Jun. 11, 2007.

Great Britain Search Report dated Apr. 12, 2005 for International Application No. GB0503083.8.

Great Britain Search Report dated Apr. 26, 2006 for British Application No. GB0602503.5.

* cited by examiner

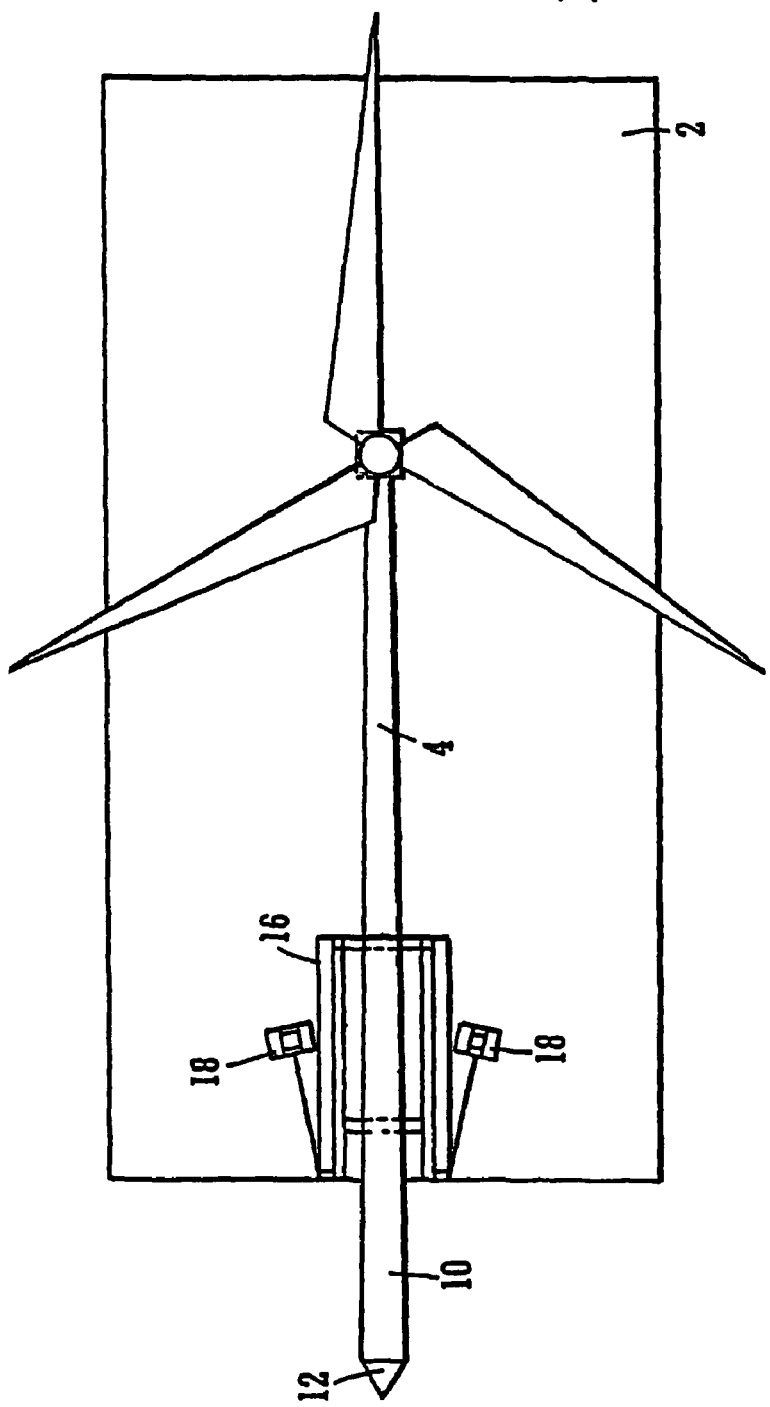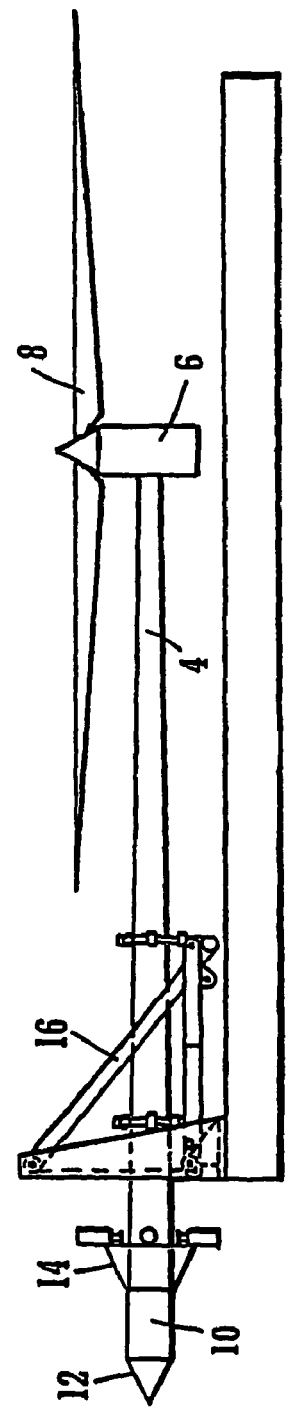

MOUNTING OF OFFSHORE STRUCTURES

This application is a U.S. National Stage of International Application No. PCT/GB03/004529 filed Oct. 20, 2003, which claims the benefit of GB 0224656.9, filed Oct. 23, 2002.

The present invention relates to the mounting of structures offshore and more especially to the mounting of structures such as wind turbines, wave machines and tidal stream turbines.

Conventionally, wind turbines or the like are mounted offshore in a suitable foundation. The wind turbines are transported to the installation site, either in a complete state or for assembly on site, by means of a jack up barge. However, jack up barges are expensive and can be difficult to use in certain locations where difficult seabed conditions or strong currents occur.

The present invention therefore seeks to provide method and apparatus for installation and alignment of offshore structures such as wind turbines which permits the use of towed or self-propelled barges or other suitable vessels to support the structure and further enables alignment of the structure at a desired angle (normally vertical) even where the foundation is installed at an angle.

According to a first aspect of the present invention there is provided a foundation for mounting an offshore structure, the foundation comprising a socket for receiving and retaining an end part of the structure, the socket having a base surface preferably of conical shape, an intermediate supporting part and an upper body having an internal guiding surface for guiding said end part into the intermediate supporting part, said guiding surface also forming a reaction surface operatively co-operating with alignment means of the structure for alignment of the structure when inserted in the foundation.

Preferably said guiding surface is frusto-conical.

Further preferably said intermediate supporting part has a substantially cylindrical inner surface sized to conform with a corresponding outer surface of said end part.

According to a second aspect of the invention there is provided a structure for mounting in the foundation of the first aspect of the invention, said structure comprising an end part for insertion into the socket of the foundation, said end part preferably having a leading end portion preferably of substantially conical shape corresponding to said conical base surface, and alignment means mounted on said end part operative to co-operate with said guiding surface when said end part is in the socket to align the structure into a desired alignment.

In a preferred embodiment of this aspect the invention, the alignment means are removable.

Preferably, the outer surface of the end part is substantially cylindrical.

Preferably also, a curved, substantially spherical or part spherical element is disposed on the tip of the leading end portion whereby the (preferably) conical leading end portion is prevented from fully abutting the conical base surface of the socket.

According to a third aspect of the invention there is provided the combination of a foundation for mounting an offshore structure and a structure mountable in the foundation, wherein the structure comprises an end part preferably having a leading end portion preferably of substantially conical shape and alignment means located on the leading end part, the foundation comprising a socket comprising a base surface preferably of substantially conical shape sized substantially to conform with the substantially conical end portion, an intermediate supporting part and an upper body having an internal guiding surface wherein the socket operatively receives the leading end part such that the base surface and the end portion are in juxtaposition and the internal guiding surface operatively provides a reaction surface against which the alignment means operatively act for adjustment of the structure into a desired alignment.

Preferably in this third aspect of the invention the alignment means are removeable.

Preferably also the internal guiding surface is frusto-conical.

In a much preferred embodiment, the inner surface of the intermediate supporting part and the outer surface of the end part of the structure are cylindrical.

In another preferred embodiment of this aspect of the invention said inner and outer surfaces are spaced apart in use. This allows the joint between the structure and the socket to be filled with grout to secure the structure in the socket in the desired alignment.

In another preferred embodiment a curved, substantially spherical or part spherical element is disposed on the tip of the leading end portion whereby the (conical) leading end portion is prevented from fully abutting the (conical) base surface of the socket. This feature assists in ensuring that a space between the structure and the socket is provided (for the insertion of grout) and also allows the structure to be aligned (with respect to the vertical) and also rotated as necessary before it is fixed in position.

A fourth aspect of the invention provides apparatus for mounting a structure as according to the second aspect of the invention in a foundation according to the first aspect of the invention, the apparatus comprising a transporting barge, means for retaining the structure on the barge during transportation in a reclined position, means for moving the structure from the reclined position to an upright position and for lowering the structure in said upright position over the side of the barge, and a guide wire attachable to the end of the structure for guiding the leading end of the structure into the socket.

Preferably the means for moving the structure from the reclined position to an upright position comprises a winched cable-stayed "A" frame.

Preferably the structure is retained while in its upright position, and lowered, by means of one or more clamps engaging the structure, the clamping arrangement allowing controlled axial movement of the structure relative to the means for supporting the structure.

Preferably the apparatus further comprises means for supplying grout to the joint between the end part of the structure and the socket.

Preferably also the means comprise supply hoses which are operatively disconnectable from the supply of grout and are sealable, and the apparatus further comprises a buoy to which the supply hoses may be attached after disconnection from the supply of grout.

Preferably the apparatus further comprises means for recovering the alignment means after the structure has been mounted in the foundation.

According to a fifth aspect of the invention there is provided method of mounting an offshore structure in a sub-surface foundation, the method comprising:

i) providing a sub-surface foundation according to the first aspect of the invention;

ii) providing a structure according to the second aspect of the invention and supporting the structure in a reclined position on a barge;

iii) providing a winched cable stayed A frame on the barge and moving the structure from the reclined position to an upright position by means of the A frame;

iv) supporting the structure in its upright position by means of clamps attached to the A frame;

v) attaching a guide wire to a end part of the structure and guiding the end part of the structure into the socket of the foundation by means of the guide wire;

vi) lowering the alignment means down the end part of the structure until the alignment means engage the internal guiding surface of the upper body of the socket and adjusting the alignment of the structure by means of the alignment means acting on the internal guiding surface until a desired alignment is achieved; and vii) releasing the clamps supporting the structure.

A preferred embodiment of this aspect of the invention further comprises the steps of:

viii) providing grout injection hoses and injecting grout into the joint between the structure and the socket;

ix) sealing the grout injection hoses; and x) attaching the sealed clamp hoses to a surface buoy.

Preferably the method of this embodiment comprises the further step of recovering the grout injection hoses and/or the alignment means when the grout in the joint has set.

For a better understanding of the invention and to show how the same may be carried into effect, reference will be made to the following drawings in which:

FIG. 1 shows a schematic plan view of a structure according to the invention carried in a reclined position in a transporting barge;

FIG. 2 is a schematic side view of the structure and barge of FIG. 1;

Figure 3:
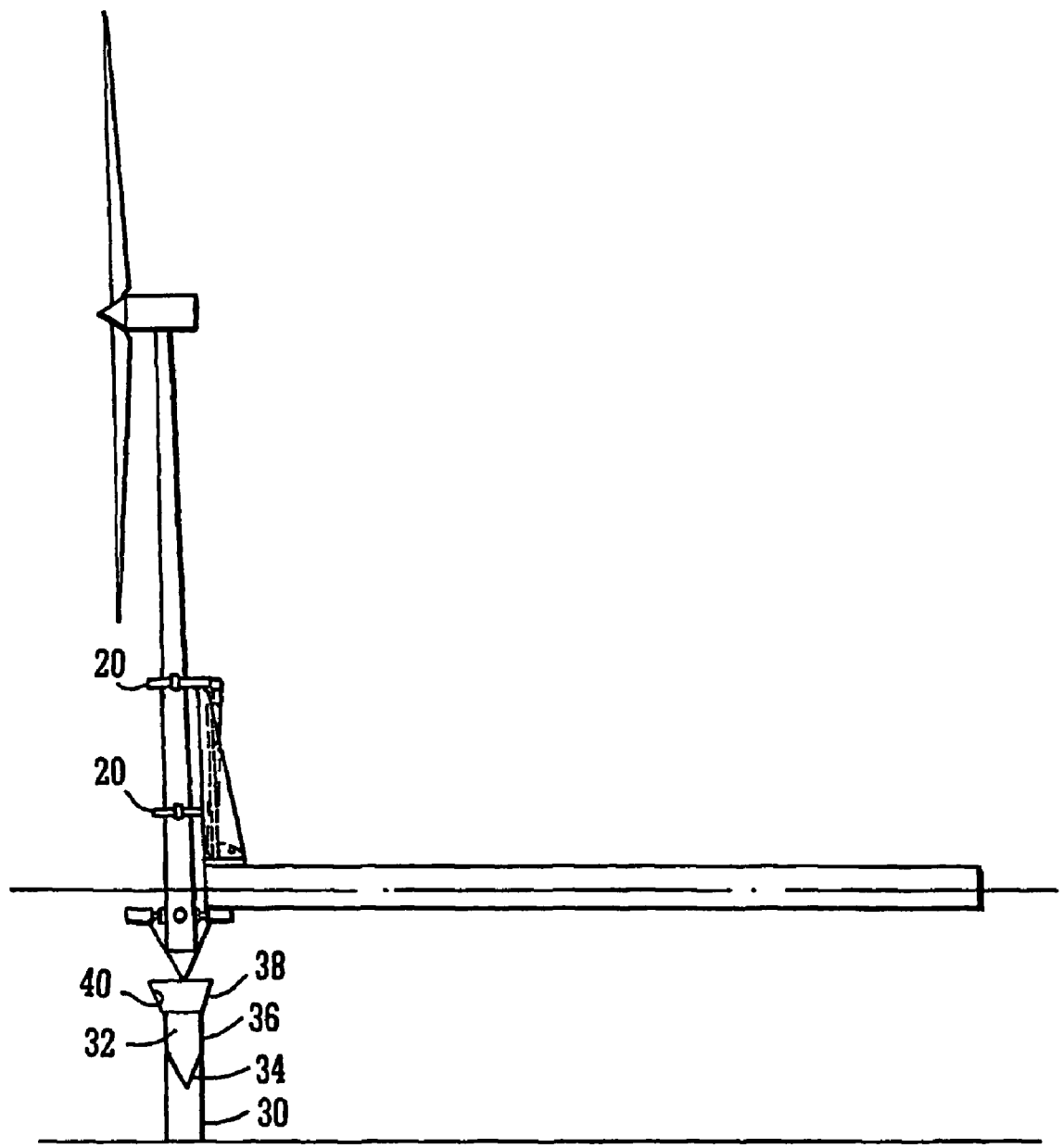
FIG. 3 is a schematic side view of the barge and structure with the structure in its upright position.

Referring now to the drawings, FIGS. 1 and 2 show a barge or other suitable vessel 2 carrying a structure in the form of a wind turbine 4 in a reclined position so that the nacelle 6 and rotor 8 are supported (the particular support means are not shown). Typically the nacelle and rotor will have a weight of around 100 tonnes. The structure 4 has an end part 10 having a conical leading end portion 12. Alignment means 14 are disposed on the end part 10. The structure 4 is attached to an A frame 16 operated with winches 18. The winches may typically be 50 tonne winches. A typical winch system for the "A" frame includes twelve fall lifting on each side with the winches working at, say, 30 m per minute line speed. In this arrangement, erection of the structure 4 to the upright position shown in FIG. 3 takes about 10 minutes. The above mentioned parameters are exemplary only and the person skilled in the art will select suitable parameters according to the particular task in hand, such as the size, weight and location of the structure.

Figure 4:
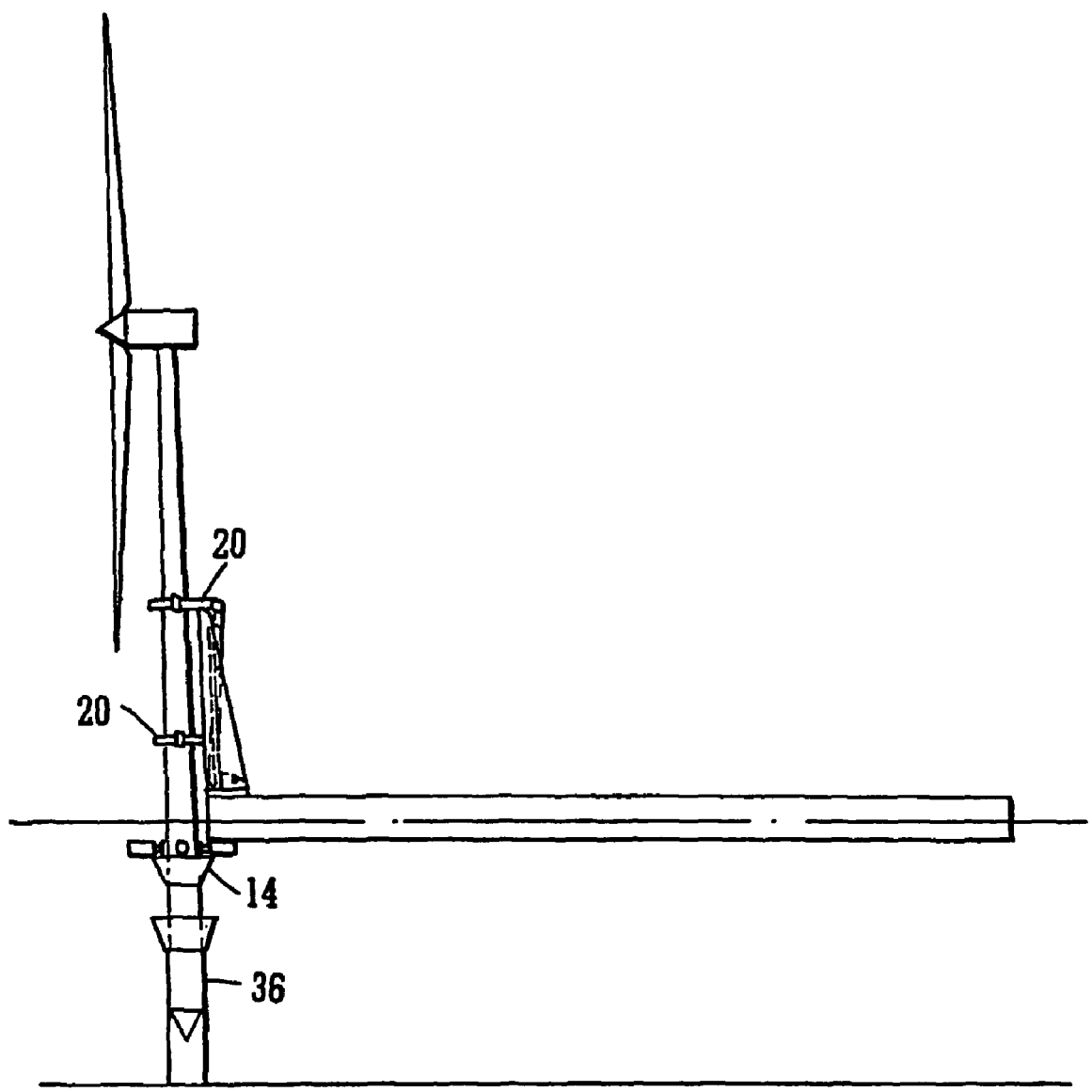
FIG. 4 is a view similar to FIG. 3 showing the structure lowered into the foundation.
Figure 5:
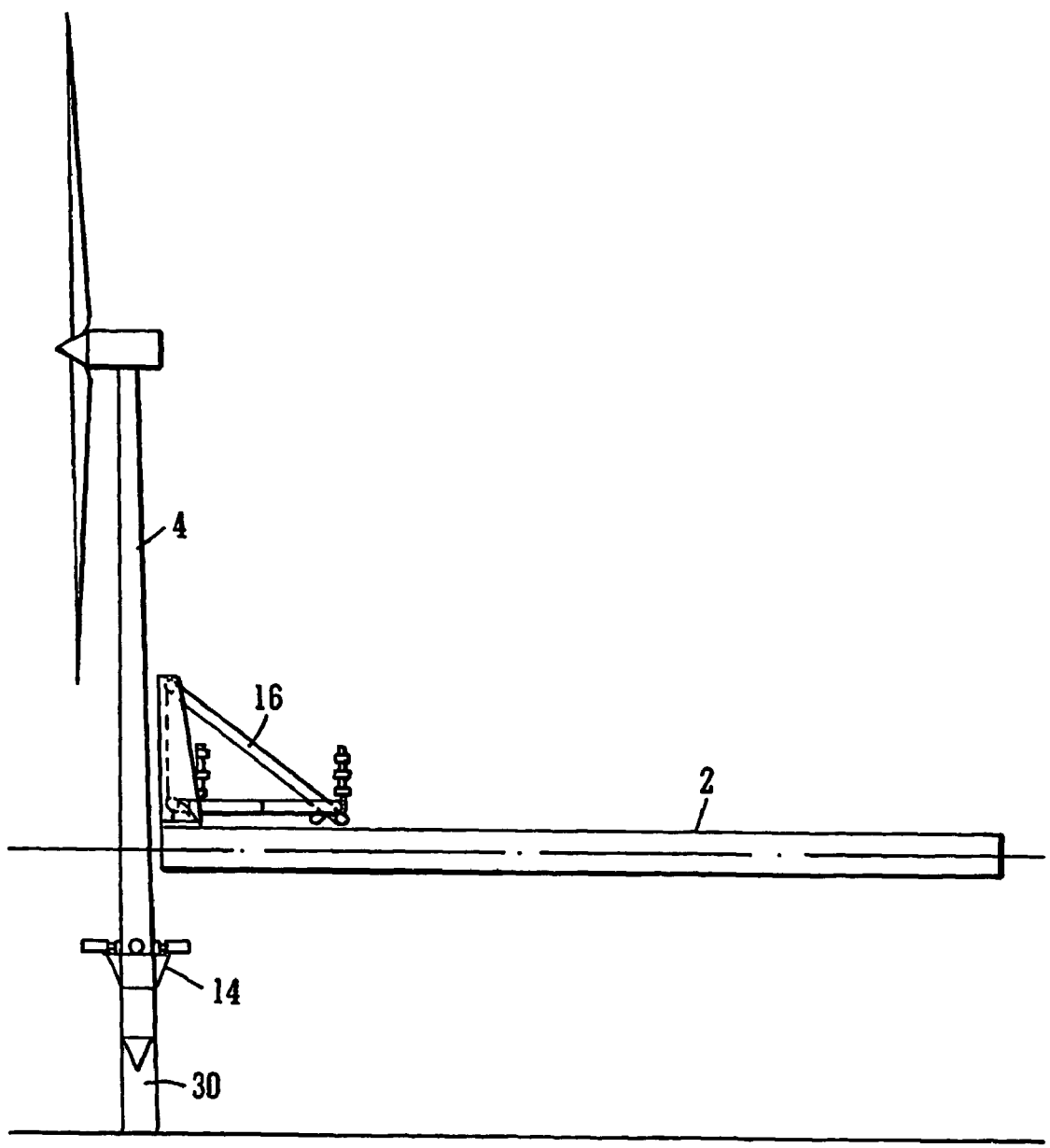
FIGS. 5 and 6 are schematic side views illustrating the disconnection and removal of the barge from the structure.
Figure 6:
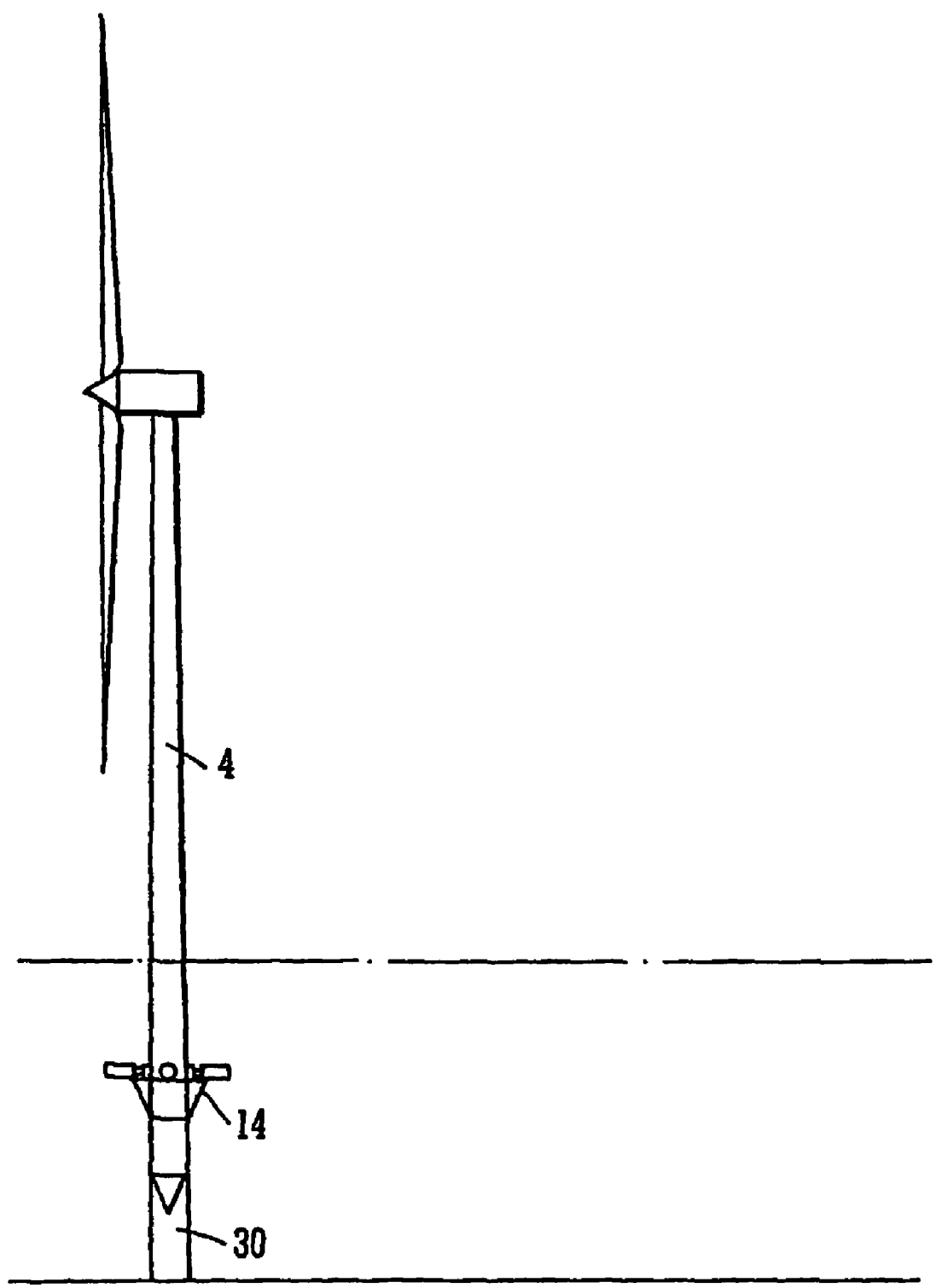
Figure 7:
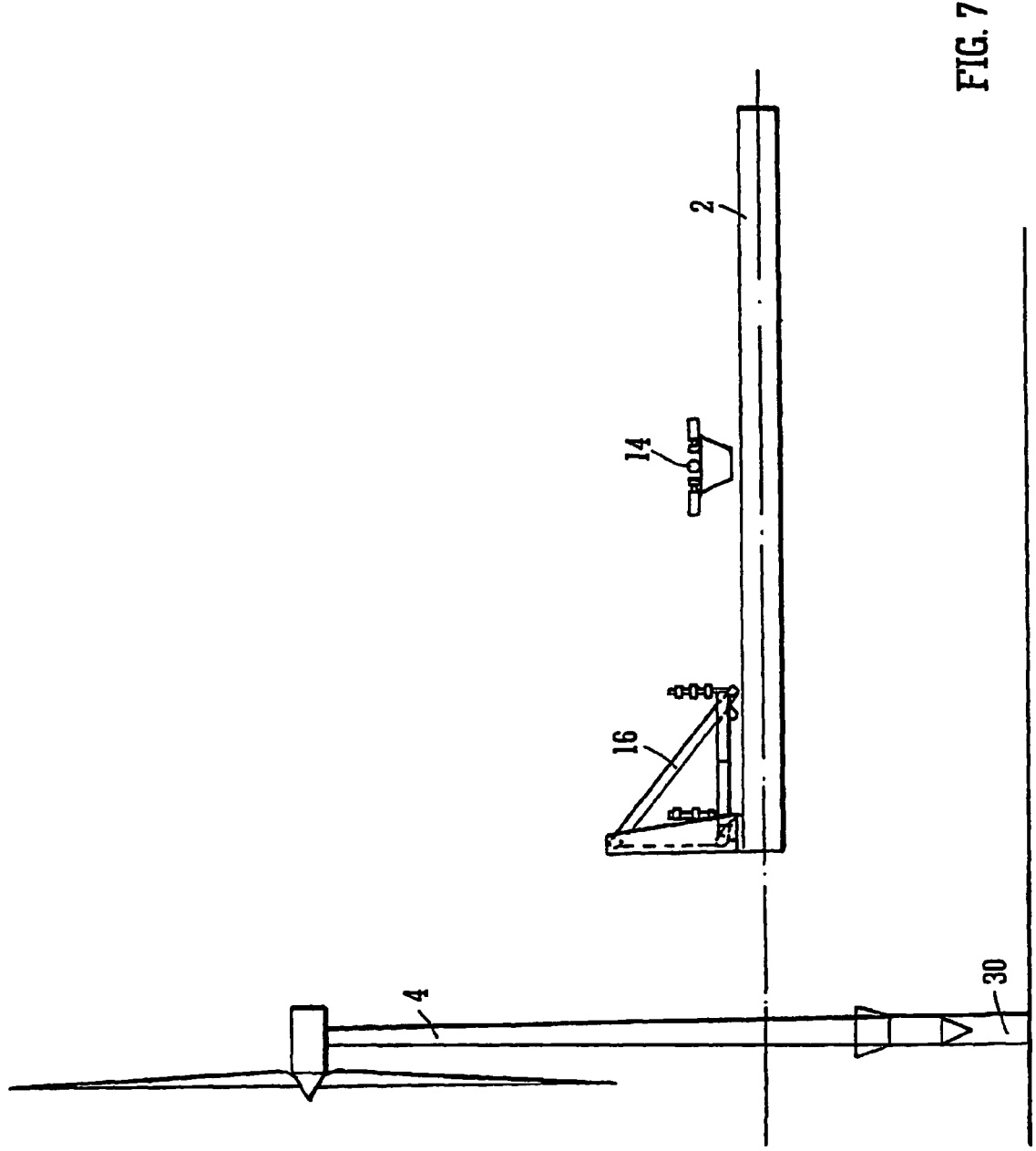
FIG. 7 is a schematic side view illustrating the removal of the alignment means.

In the upright position, the structure 4 is supported by a number of clamps 20. In the clamping arrangement illustrated in FIGS. 3 and 4, the clamps 20 comprise two (or more) separate radial clamps, spaced axially along the structure. The structure is lowered from the barge 2 into the foundation 30 in a controlled manner by, for example, opening a lower one of the clamps and causing the upper one of the clamps to move downwardly, so taking the structure 4 downwardly towards the foundation 30. At the limit of movement of the upper clamp (or at a desired point before that), the lower clamp is engaged, and the upper clamp is released and returned to its initial position. The sequence is then repeated until the structure 4 is lowered into the foundation. The sequence may be applied in reverse for removal of the structure 4 from the foundation 30.

In a less preferred variation, separate means such as a crane are provided to support the weight of the structure and the clamps are used only for alignment of the structure 4.

Figure 8:
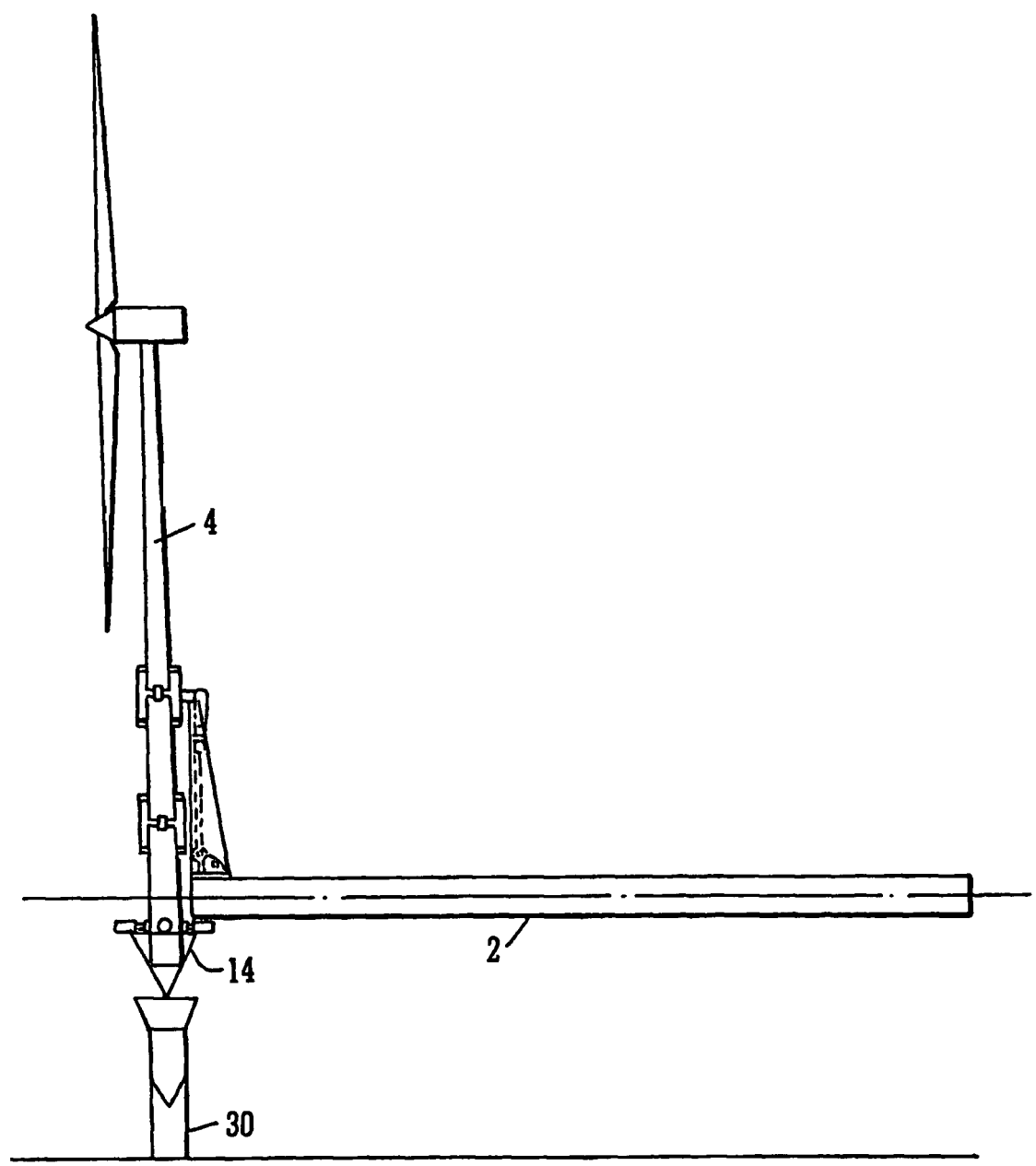
FIG. 8 is a schematic side view similar to FIG. 3 showing alternative clamps for supporting the structure.

In the clamping arrangement shown in FIG. 8, clamps in the form of track type tensioners are used to support the structure 4. These track type tensioners take the form of a plurality of continuous articulated tracks arranged radially around the structure. Each track comprises a plurality of track links each articulated to a neighbouring track link to form a continuous loop. Each track link is provided with a gripping surface for gripping the structure 4. The tracks are arranged to lie axially with respect to the structure 4 so that by driving the tracks in a forward or reverse direction, the structure 4 may be moved up or down. An advantage of track type tensioners is that they can accommodate structure of shapes other than plain cylindrical, such as tapering shapes which is more difficult to achieve with the annular clamps of FIGS. 3 and 4. For this purpose, the track type tensioners can be mounted on a bogie arrangement which ensures that the tracks make contact with the structure along their entire working length rather than at a single point.

In erecting the structure 4, a combination of hydraulic cylinders and/or cables can be used to ensure that as the weight of the structure 4 passes overcentre the motion of the A frame is controlled. Alternatively, the pivots on which the A frame is mounted can be located to ensure that the weight always remains on the barge side of the pivot, so that the need to overcentre is avoided.

When the structure 4 is in its upright position a guide or pull wire is attached to the end part 10 of the structure 4. The guide wire is used to guide the end part 10 of the structure into a pre-positioned foundation 30. The foundation 30 includes a socket 32 having a base surface 34 having an internally conical shape and a generally cylindrical intermediate part 36. Mounted at an upper part of the intermediate part 36 is an upper body 38. The upper body 38 includes an internal surface 40 which is frusto-conical. As the structure 4 is lowered from the barge by use of the clamps 20 the inner surface 40 assists in guiding the end part 10 of the structure 4 into the socket 32, in combination with the conical leading end portion 12 and the guide wire. Once the structure 4 is accommodated in the socket 32, the structure provides a temporary means of locating the barge which permits movement of the barge in the swell of the water and rotationally around the structure 4 but prevents translational movement of the barge away from the structure.

Figure 9:
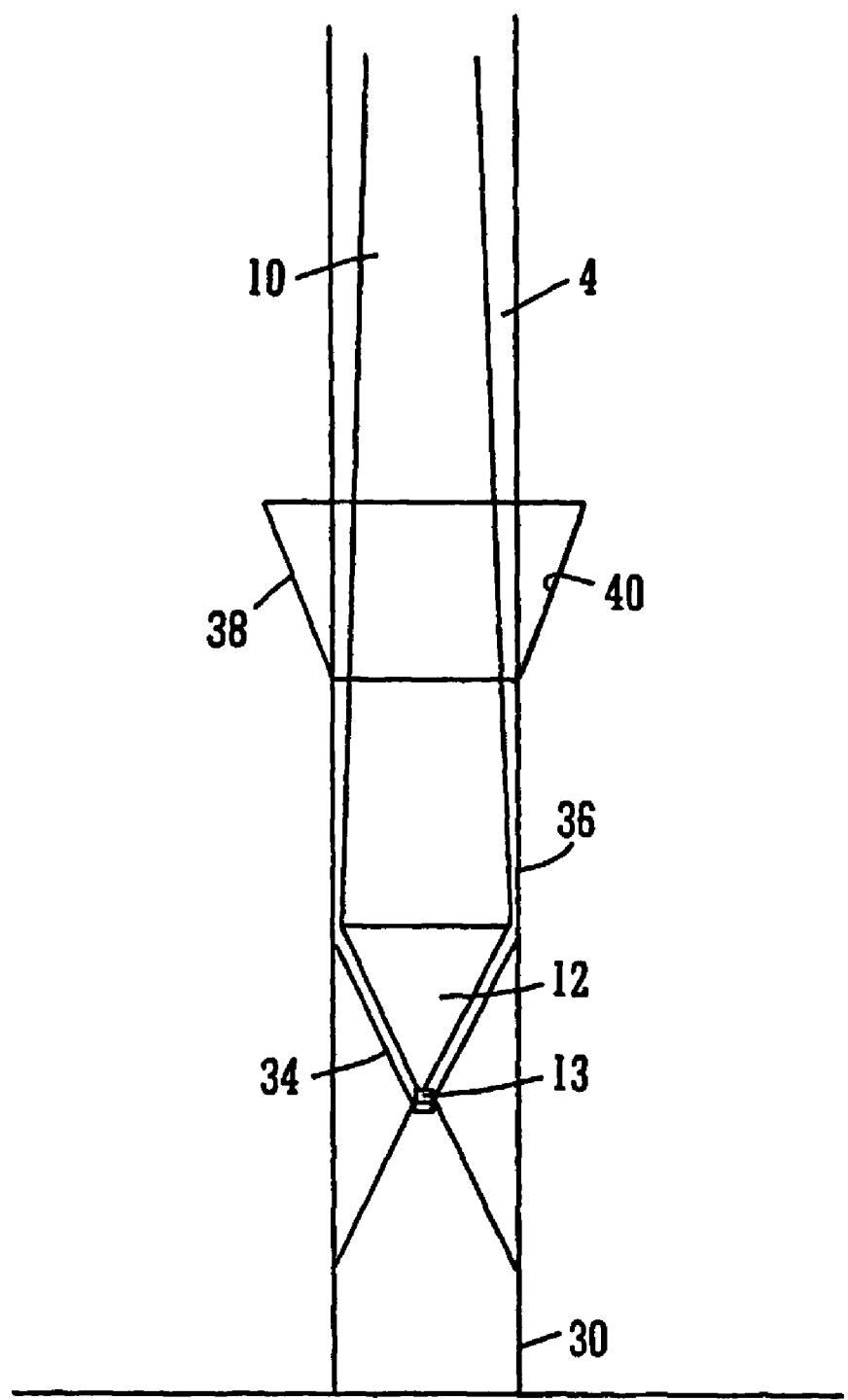
FIG. 9 illustrates schematically on a larger scale the mounting of the structure in its foundation.

An "interface ball" 13 in the form of a curved, spherical or part spherical element is disposed on the apex of leading end portion 12 (FIG. 9). This interface ball has a number of functions. In particular, the interface ball ensures that the walls of the socket and of the end part 10 of the structure are maintained in slightly spaced apart relation. This allows rotation of the structure 4 with respect to the socket during installation and also allows some movement of the structure relative to the socket during installation so that a desired alignment of the structure 4 with respect to the vertical can be achieved, even where the foundation is not absolutely correctly aligned. Normally, the desired alignment is vertical. The spacing apart of the walls of the structure and socket also provides a void which can be filled with grout to set the structure in its desired alignment. During the alignment of the structure, the clamps 20 are placed in a constant low tension to accommodate heaving up and down of the barge 2 in any swell.

When the structure 4 has been located in the socket 32, alignment of the structure 4 is undertaken. For this purpose, alignment means 14 are lowered down the end part 10 until they contact the inner surface 40. The alignment means preferably comprise a plurality of hydraulic cylinders and typically four such cylinders are provided. Once the alignment means are in place, the clamps 20 can be released. The alignment means 14 are then used to set the structure 4 in its desired alignment. The inner surface 40 acts at this stage as a reaction surface against which the alignment means 14 (hydraulic cylinders) act to provide the required movement of the structure to adjust its position and, when that position is achieved, to retain the structure in that position. Once the desired alignment is achieved, the alignment means can be locked in position.

In one preferred arrangement of the invention where the installation of the structure is essentially permanent, grout is injected into the void between the walls of the socket 32 and the end part 10 of the structure through suitable hoses. When the joint is full of grout, the hoses can be sealed off and attached to a buoy. The barge 2 can then move away and be engaged in other work. When the grout is fully set a barge 2 may return to retrieve the alignment means 14.

In an alternative arrangement, the alignment means 14 may be left in place when locked in position and no grout is then required. This facilitates later removal of the structure 4, for example for maintenance on land. In this case, the alignment means 14 which may be shove cylinders, screw jacks or the like can be built as a fixed part of the structure 4 so that for removal of the structure 4 it is not necessary to pick up cables, hoses and the like to initiate release of the alignment means 14, these being provided integrally with the structure.

Figure 10:
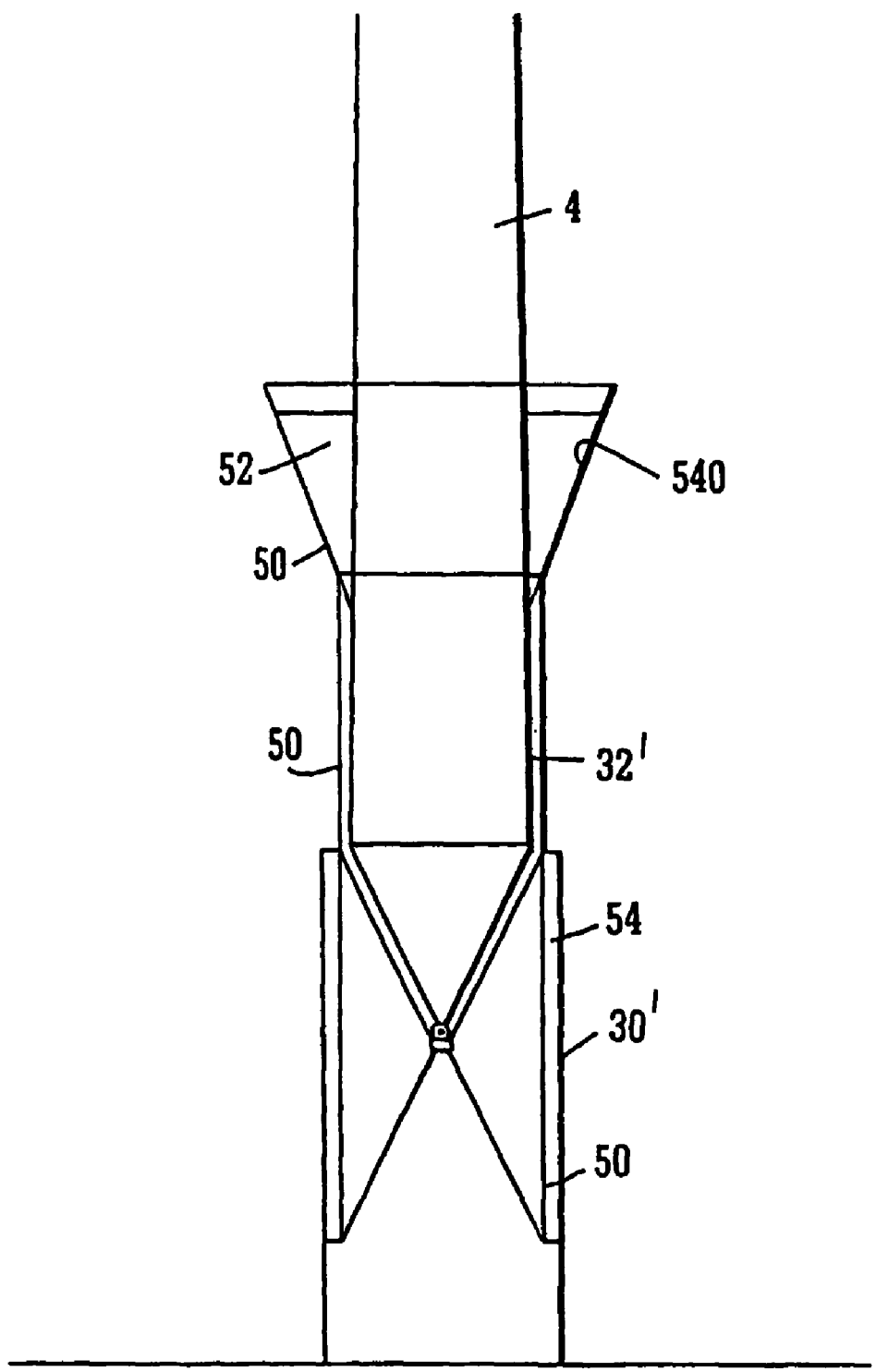
FIG. 10 illustrates schematically an alternative construction of the invention.

In a variation of the invention illustrated in FIG. 10 and interface piece 50 is provided at the top of the foundation 30'. The interface piece 50 is set in a desired alignment during installation in the foundation 30', such as by grouting (54) to the foundation 30'. The interface piece 50 includes an inner surface 540 analogous to inner surface 40. Thus the structure 4 can be lowered into a socket 32' of the interface piece 50 in the same manner as described above in relation to foundation 30, but because the interface 50 determines the correct alignment, separate alignment means are not needed. A number of tapered clamps 52 are desirably provided to grip the structure and retain it in its desired position. In this construction, the weight of the structure 4 essentially holds the structure in place in the foundation. For removal of the structure 4 the tapered clamps may be removed by a tool frame which releases the structure and allows it to be removed from the foundation.

The invention claimed is:

1. The combination of a foundation and an offshore structure mountable in the foundation, wherein the offshore structure comprises an end part having a leading end portion of substantially conical shape and controllable alignment means, the foundation comprising a socket comprising a base surface of substantially conical shape sized substantially to conform with the substantially conical leading end portion, an intermediate supporting part and an upper body having an internal guiding surface that is frusto-conical, wherein the socket operatively receives the end part such that the conical base surface and the conical leading end portion are in juxtaposition and the internal guiding surface operatively provides a reaction surface against which the controllable alignment means operatively act for adjustment of the offshore structure into a desired alignment when the end part has been accommodated in the socket, the alignment means detachable from the end part after the end part is inserted in the foundation, and wherein the inner surface of the intermediate supporting part and the outer surface of the end part adjacent the substantially conical leading end portion of the structure are cylindrical.

2. A combination as claimed in claim 1 wherein said inner and outer surfaces are spaced apart in use.

3. A combination as claimed in claim 1 wherein a curved, substantially spherical or part spherical element is disposed on the tip of the leading end portion whereby the conical leading end portion is prevented from fully abutting the conical base surface of the socket.

4. A combination as claimed in claim 1 wherein the alignment means are a plurality of hydraulic cylinders.

5. A combination as claimed in claim 1, further comprising a means for recovering the alignment means from the end part after the end part is inserted into the foundation and the alignment means is detached from the end part.

6. A combination as claimed in claim 1, the alignment means moveable along the length of the end part.

7. A combination as claimed in claim 1, the alignment means reattachable to the end part.

8. A combination as claimed in claim 1 wherein the alignment means are removeable.

\* \* \* \* \*